(12) United States Patent
Bickel, III

(10) Patent No.: US 8,117,873 B2
(45) Date of Patent: Feb. 21, 2012

(54) GOOSENECK TRAILER LOCK

(76) Inventor: Paul J. Bickel, III, Louisville, KY (US)

( * ) Notice: Subject to any disclaimer, the term of this patent is extended or adjusted under 35 U.S.C. 154(b) by 0 days.

(21) Appl. No.: 12/701,763

(22) Filed: Feb. 8, 2010

(65) Prior Publication Data

US 2010/0263413 A1 Oct. 21, 2010

Related U.S. Application Data

(63) Continuation-in-part of application No. 12/425,589, filed on Apr. 17, 2009, now abandoned.

(51) Int. Cl.
*E05B 73/00* (2006.01)

(52) U.S. Cl. .................. 70/14; 70/238; 70/201; 70/258; 70/237; 280/507

(58) Field of Classification Search ...... 70/158, 70/159, 164, 199, 200, 201, 202, 203, 204, 70/209, 237, 238, 258, 259; 280/507
See application file for complete search history.

(56) References Cited

U.S. PATENT DOCUMENTS

| | | | |
|---|---|---|---|
| 1,333,878 A | | 3/1920 | Smith |
| 4,488,417 A | | 12/1984 | Werner |
| 4,696,172 A | | 9/1987 | Farrow |
| 4,779,435 A | | 10/1988 | Farrow |
| 4,819,461 A | | 4/1989 | Pearson |
| 5,382,109 A | | 1/1995 | Nyman |
| 5,520,030 A | * | 5/1996 | Muldoon .................. 70/14 |
| 6,109,078 A | * | 8/2000 | Marshall .................. 70/232 |
| 6,199,891 B1 | | 3/2001 | Bell et al. |
| 6,315,315 B1 | | 11/2001 | Seale |
| 6,880,368 B1 | | 4/2005 | Ulbrich et al. |
| 7,100,937 B2 | * | 9/2006 | Hogan .................. 70/200 |
| 7,378,013 B2 | | 5/2008 | Sandler |
| 7,412,859 B2 | | 8/2008 | Lycoudis |
| 2008/0148792 A1 | * | 6/2008 | Davis .................. 70/238 |

* cited by examiner

*Primary Examiner* — Suzanne Barrett
*Assistant Examiner* — David E Sosnowski
(74) *Attorney, Agent, or Firm* — King & Schickli, PLLC

(57) ABSTRACT

A gooseneck trailer lock is provided including a body having a coupler engaging portion and a trailer frame engaging portion. A lock secures the body to the trailer.

11 Claims, 11 Drawing Sheets

GOOSENECK TRAILER LOCK

This application is a continuation-in-part of U.S. patent application Ser. No. 12/425,589, filed on 17 Apr. 2009 now abandoned.

TECHNICAL FIELD AND INDUSTRIAL APPLICABILITY OF THE INVENTION

The present invention relates generally to the trailer towing field and, more particularly, to a method and apparatus for locking a gooseneck trailer hitch to prevent unauthorized hitching or unhitching of a gooseneck trailer.

BACKGROUND OF THE INVENTION

Gooseneck trailers have long been known in the art for use to haul various types of cargo. Gooseneck trailers are equipped with a coupling device such as disclosed in, for example, U.S. Pat. No, 5,382,109 to Nyman. As illustrated in FIG. 1, the coupling device 10 comprises a stationary plate 12 which is integrally formed to include a recess 14. The recess 14 substantially conforms to the spherical contour of the distal end of a towing ball 16 of a type well known in the art. A lock plate 18 is secured in locking position by means of an actuator 20 including a latch pin 22 and a manually operable handle portion 24.

When not in use, it is desirable to lock the hitch of a gooseneck trailer to prevent unauthorized hitching or unhitching of the trailer. Toward this end, a number of gooseneck trailer locks have been developed. Examples of these are disclosed in U.S. Pat. No. 5,520,030 to Muldoon, U.S. Pat. No. 6,109,078 to Marshal and U.S. Pat. No. 6,880,368 to Ulbrich et al. The locking devices developed to date typically suffer from a number of shortcomings. For example, the locking devices disclosed in the Muldoon and Marshal patents are long and unwieldy. As a result of their size they are also difficult to store and maintain readily at hand when needed for use. The locking device in the Ulbrick et al reference incorporates a relatively small locking pin and cooperating padlock to secure the lock plate of the coupling device in the locked position and thereby prevent connection to the towing ball of a vehicle. It should be appreciated, however, that the device does not prevent removal of the entire coupler from the trailer and replacement with another coupler which a thief can then use to tow the trailer away.

It is therefore clear that a need exists for a new and improved gooseneck trailer lock that prevents unauthorized connection of a trailer to a towing vehicle as well as removal of the coupler from the trailer. Advantageously, the present invention performs these functions while being both simple in design and inexpensive to manufacture.

SUMMARY OF THE INVENTION

In accordance with the purposes of the present invention as described herein, a gooseneck trailer lock is provided. That gooseneck trailer lock comprises a body and a lock securing the body to the trailer. The body includes both a coupler engaging portion and a trailer frame engaging portion.

In accordance with another aspect of the present invention a gooseneck trailer lock comprises a body and a cooperating lock. The body has a hook, a lug spaced from the hook, and a spur adjacent to the hook.

In accordance with still another aspect of the present invention a method of fitting a gooseneck trailer lock to a gooseneck trailer is provided. That method comprises the steps of: (a) positioning a coupler engaging portion of the gooseneck trailer lock in engagement with the coupler on the trailer, (b) determining a point where a trailer frame engaging portion of the gooseneck trailer lock engages the trailer frame and (c) drilling a hole in the trailer frame at that point. If the engaging portion of the gooseneck trailer lock does not engage with the trailer frame at a satisfactory point, then a small steel plate with a hole in it can be attached to the trailer frame.

In accordance with yet another aspect of the present invention a method of locking a gooseneck trailer with a gooseneck trailer lock is provided. That method comprises the steps of: (a) engaging a coupler engaging portion of the gooseneck trailer lock with the coupler on the gooseneck trailer, (b) inserting a trailer frame engaging portion of the gooseneck trailer lock into an opening in a frame of a gooseneck trailer and (c) locking the trailer frame engaging portion of the gooseneck trailer lock in the opening of the trailer frame with a shackle.

In the following description there is shown and described two different embodiments of the invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated herein and forming a part of the specification, illustrate several aspects of the present invention and together with the description serve to explain certain principles of the invention. In the drawings.

Reference will now be made in detail to the present preferred embodiment of the invention, examples of which are illustrated in the accompanying drawings.

DETAILED DESCRIPTION OF THE PREFERRED EMBODIMENTS OF THE INVENTION

Figure 1:
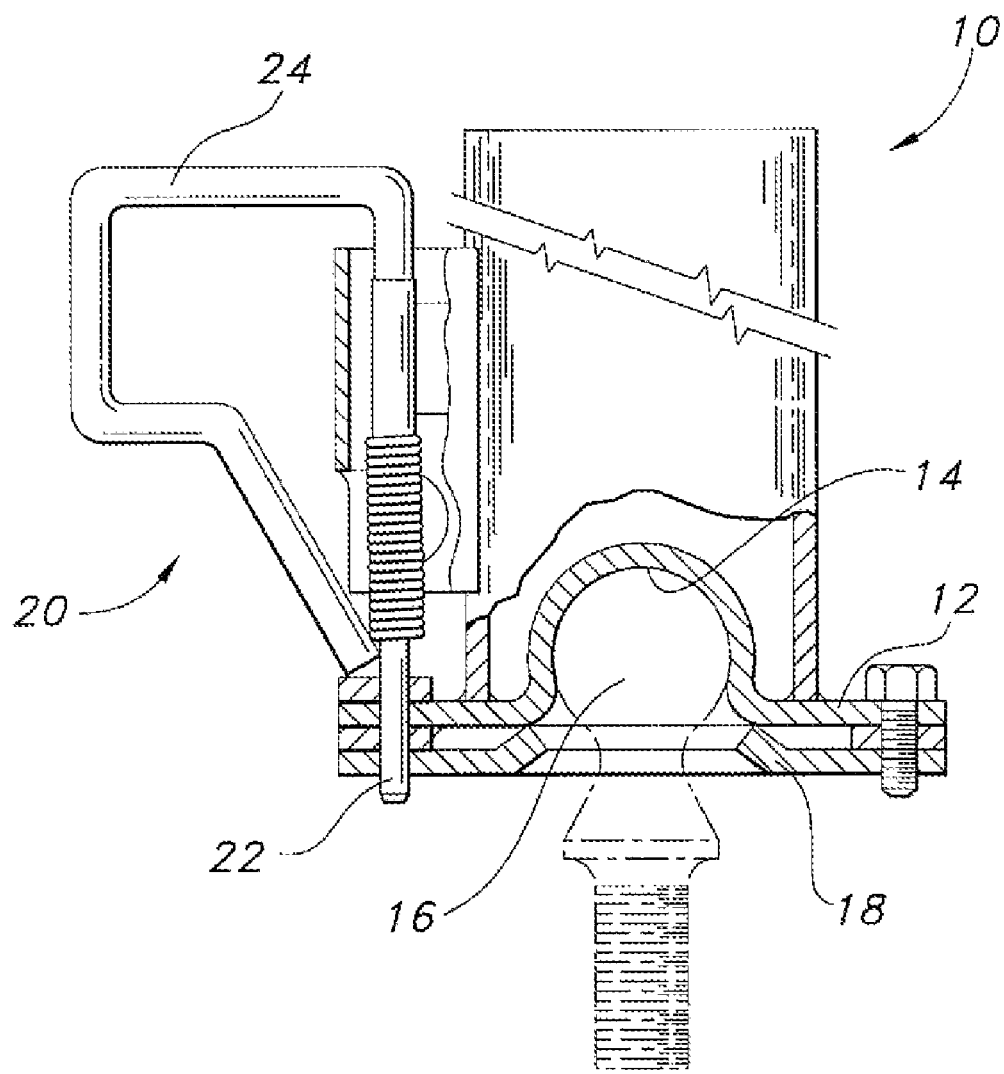
FIG. 1 is a fragmentary elevational view, partly in section, illustrating a coupling device of a type known in the art for coupling a gooseneck trailer to a towing ball of a type known in the art that is connected to a towing vehicle.
Figure 2:
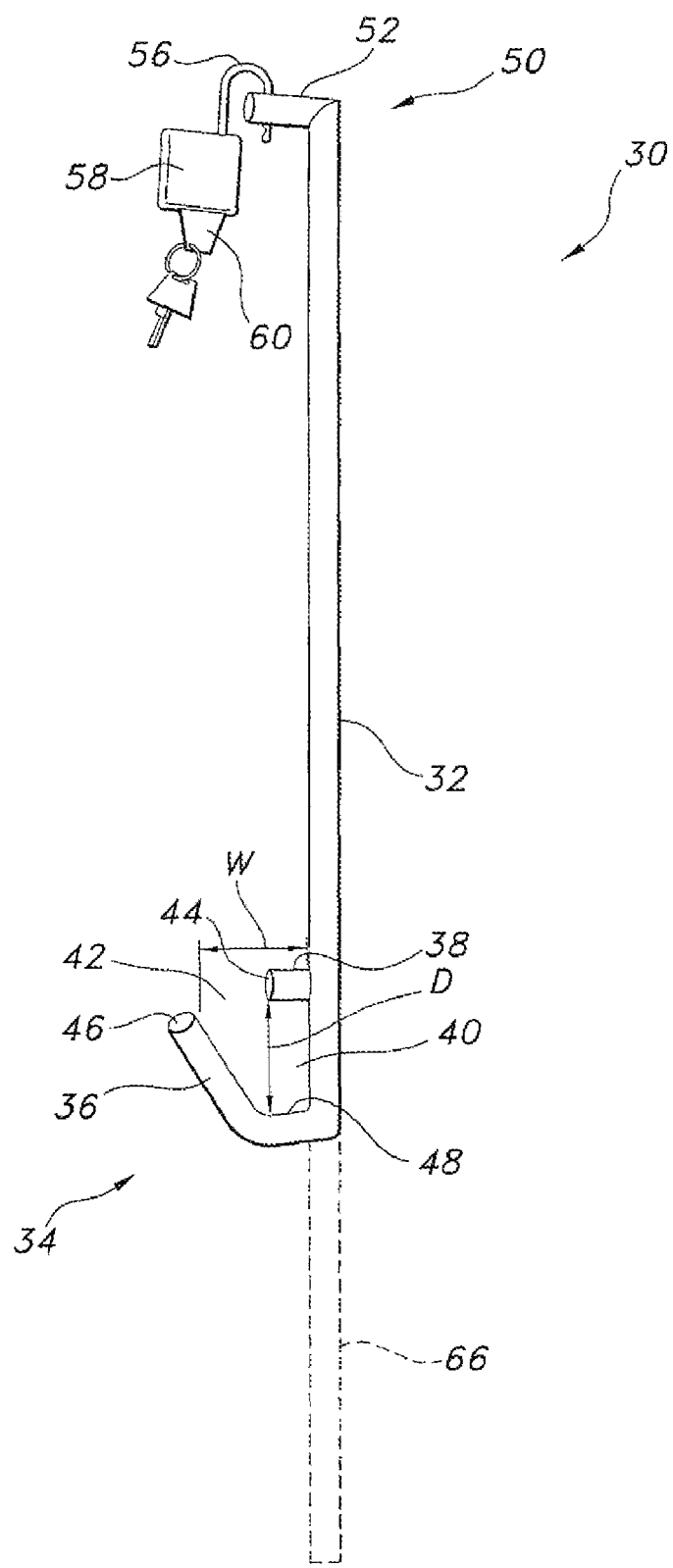
FIG. 2 is an elevational view of the gooseneck trailer lock of the present invention.

Reference is now made to FIG. 2 illustrating the gooseneck trailer lock 30 of the present invention. The gooseneck trailer lock 30 comprises an elongated body 32 formed from a high strength material such as, for example, hardened steel. The body 32 includes a coupler engaging portion 34 comprising a hook 36 and spur 38. As illustrated the hook 36 and spur 38 define an opening 40 and an entryway 42 in communication with the opening. In the illustrated embodiment, the opening 40 is polygonal in shape. Further, the entryway 42 is provided along one side of the opening 40 between the distal or first end of the spur 44 and the second or distal end 46 of the hook 36. The opening 40 has a depth D as measured from the top of the opening at the entry way 42 at the spur end 44 to the bottom 48 of the opening of between about 6.35 centimeters (2-½") and about 8.89 centimeters (3-½") and a width W adjacent the entry way of between about 6.35 centimeters (2-½") and about 8.89 centimeters (3-½"). Further, the entry way 42 itself has a width of between about 4.45 centimeters (1-¾") and about 5.72 centimeters (2-¼").

The body 32 also includes a trailer frame engaging portion 50 comprising a lug 52. Lug 52 includes an aperture 54 for receiving the shackle 56 of a padlock 58. As illustrated, the padlock 58 is opened and closed by means of the key 60. It should be appreciated, however, that substantially any other type of padlock such as a combination padlock may be utilized if desired. In one possible embodiment the lug 52 has a length of between about 3.18 centimeters (1-¼") and about 4.45 centimeters (1-¾"). Further, the lug is spaced between about 45.72 centimeters (18") and about 60.96 centimeters (24") from the spur 38.

Figure 3A:
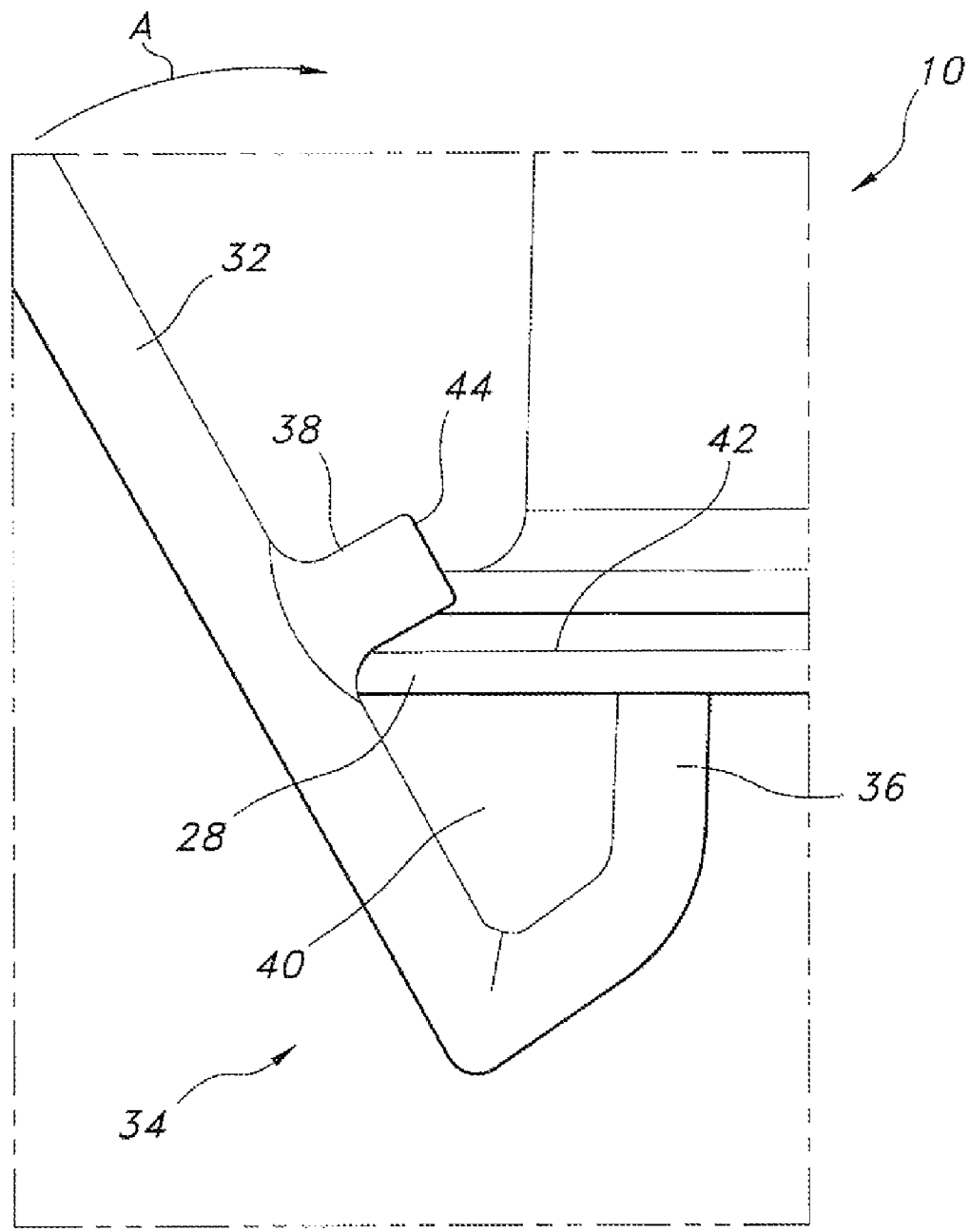
FIGS. 3A and 3B are detailed perspective views illustrating the connection of the coupler connecting portion or hook of the trailer lock to the coupler secured to the gooseneck trailer.
Figure 3B:
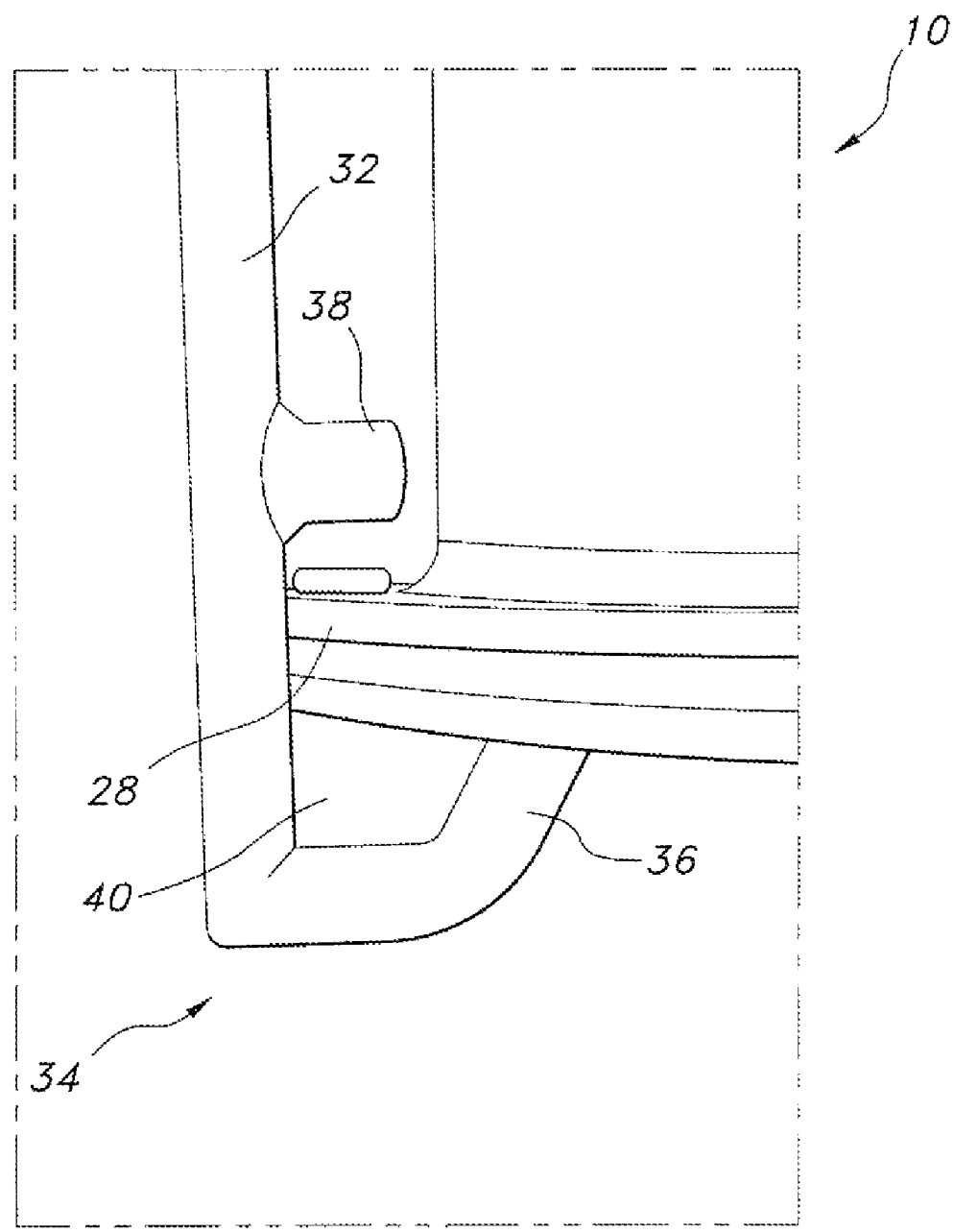

As should be appreciated, the gooseneck trailer lock 30 is a relatively compact and simple design that is both inexpensive to manufacture and easy to use. A trailer may be locked using the apparatus 30 by first engaging the coupler engaging portion 34 of the gooseneck trailer lock 30 with the coupling device or coupler 10 on the gooseneck trailer T. As best illustrated in FIG. 3A this is done by angling the body 32 relative to the coupler 10 so that the end 46 of the hook 36 may be inserted into the coupler 10 while the lip 28 of the coupler passes through the entryway 42 into the opening 40. Next, the body 32 is moved toward the coupler 10 (see action arrow A in FIG. 3A) so that the body is substantially parallel to the coupler 10 and the sheath S of the trailer T in which the coupler is telescopingly received and secured (see also FIG. 5B). As illustrated in FIG. 3B, when the body 32 is in this position, the spur 38 overlies the lip 28 of the coupler 10.

Figure 4A:
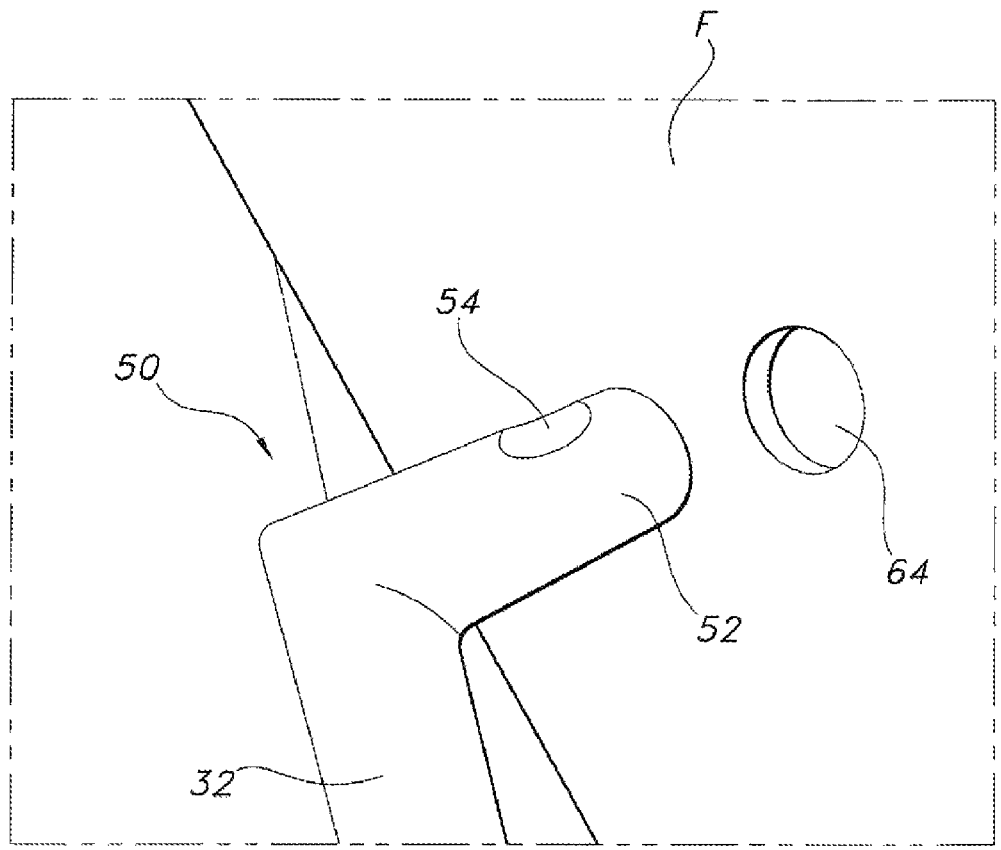
FIGS. 4A and 4B illustrate the connection of the trailer frame engaging portion or lug of the gooseneck trailer lock to the trailer frame.
Figure 4B:
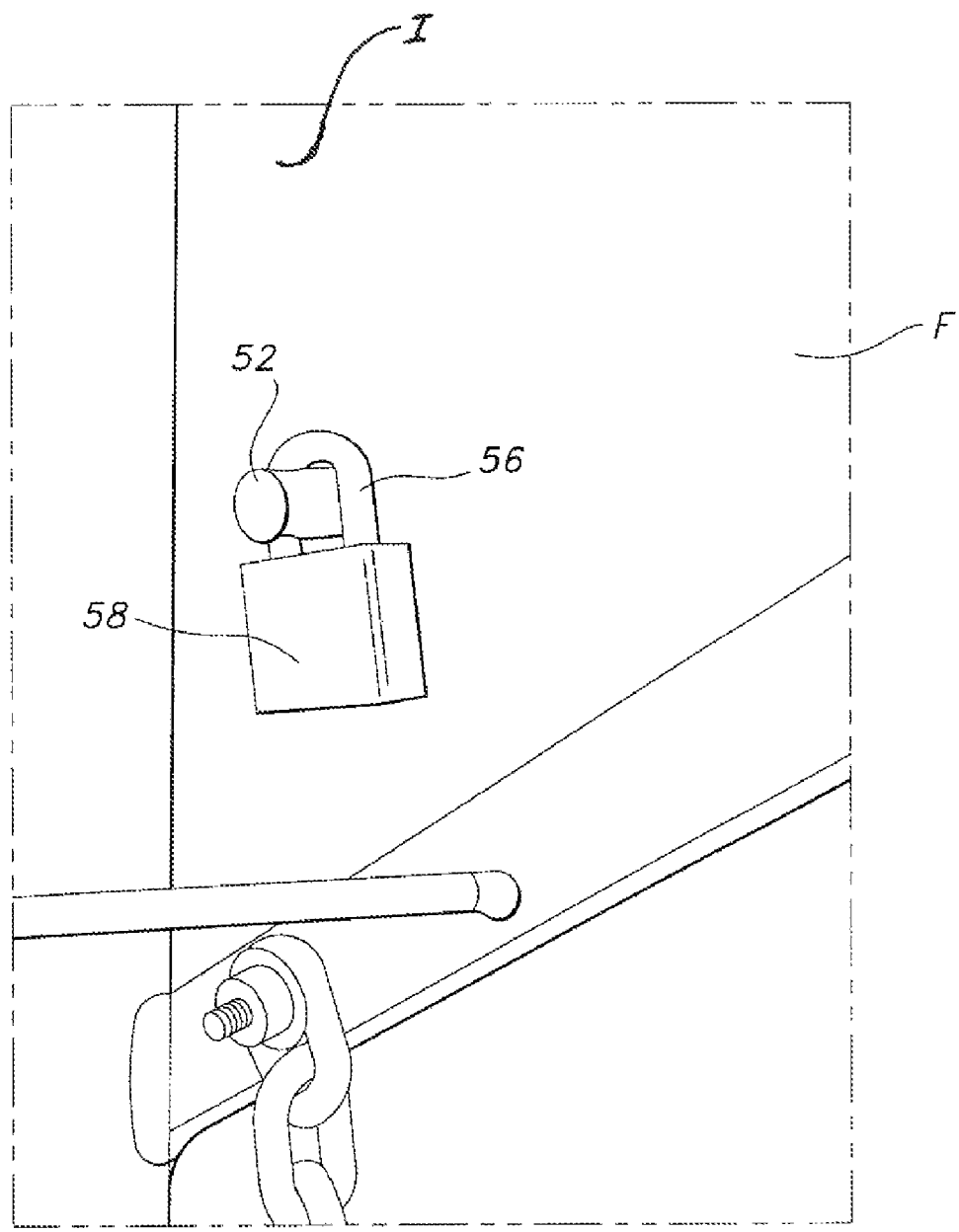

As the body 32 is moved into this position, the trailer frame engaging portion or lug 52 is inserted into an opening 64 previously drilled in the trailer frame F (see FIG. 4A). When fully inserted, the lug 52 extends through the trailer frame F so that the aperture 54 in the lug 52 is fully exposed inside the interior face I of the trailer frame F (see also FIG. 4B). The shackle 56 of the padlock 58 is then inserted through the aperture 54 and the padlock is closed and locked. In this position, the trailer frame F is captured on the lug 52 between the body 32 of the trailer lock 30 and the shackle 56 of the padlock 58.

Figure 5A:
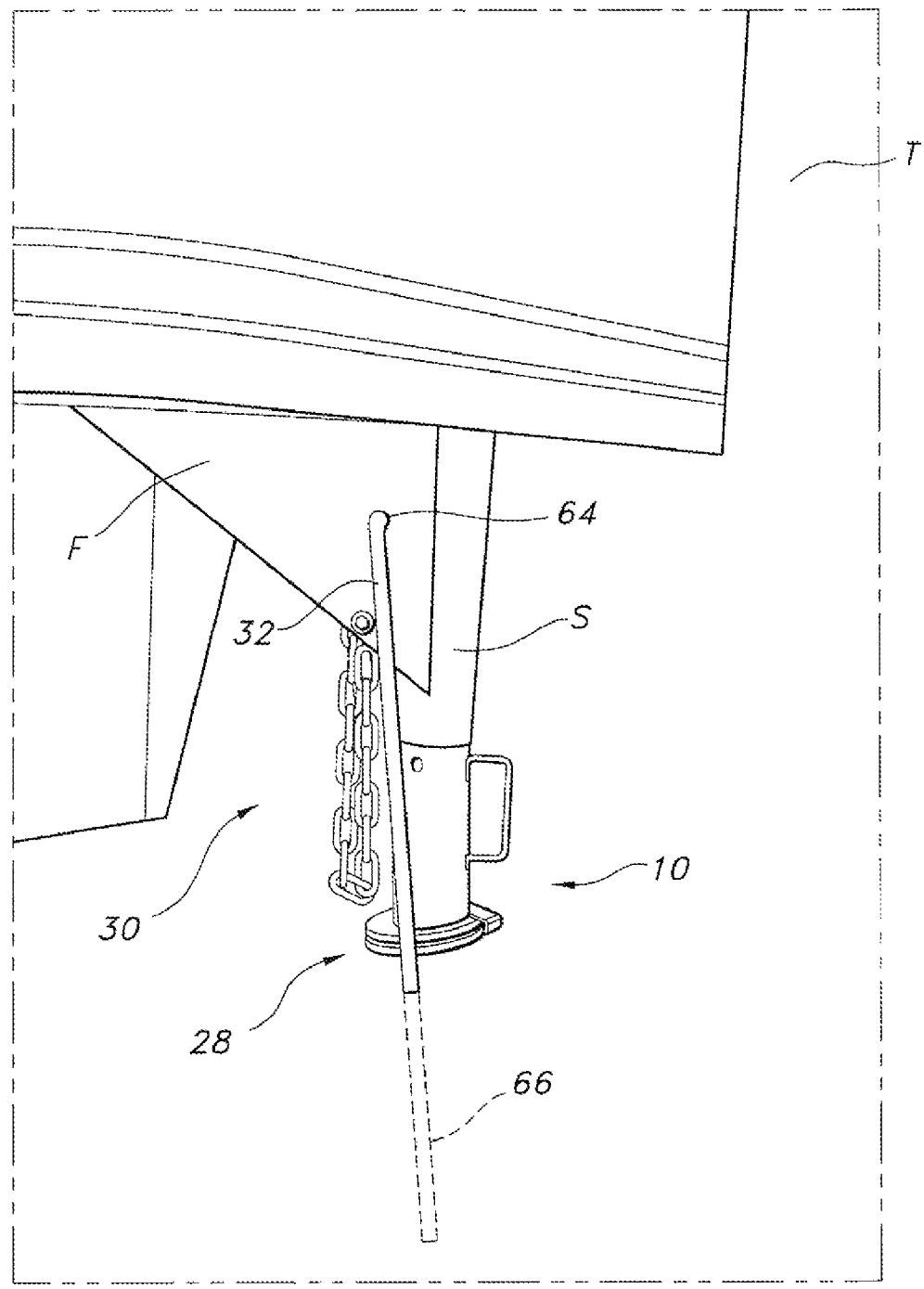
FIGS. 5A and 5B are two perspective views illustrating the gooseneck trailer lock of the present invention secured in position to prevent the theft of a gooseneck trailer and the removal of the coupling device from the trailer.
Figure 5B:
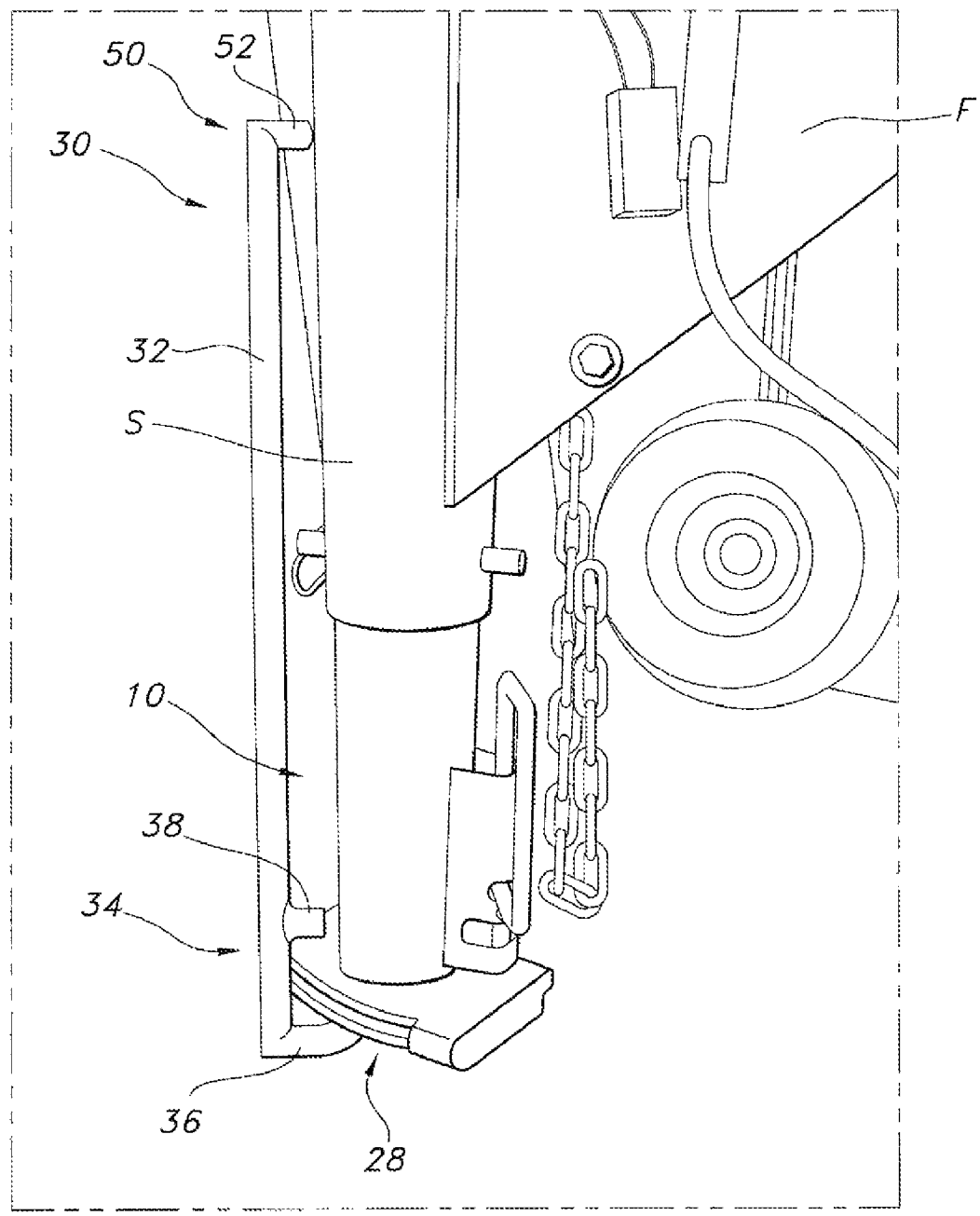

As should be appreciated, when the gooseneck trailer lock 30 is in the locked position illustrated in FIGS. 5A and 5B, the coupler 10 is captured in the opening 40 by the hook 36 and spur 38. The end of the hook 36 received in the coupler 10 interferes with and prevents anyone from securing the coupler to the towing ball of a towing vehicle. Further, since the coupler 10 is captured in the opening 40, the coupler 10 cannot be removed from the sheath S of the trailer T and, therefore, cannot be stolen or replaced with another coupler by a thief. It should also be appreciated that the padlock 58 is secured to the lug 52 adjacent the interior face I of the frame F where the padlock is protected from the elements on many trailers. Thus, the padlock is protected from precipitation and as such should not freeze in the winter or rust over time.

It is a simple procedure to fit the gooseneck trailer lock 30 to the trailer. The first step of the method comprises positioning the coupler engaging portion 34 in engagement with the coupler 10 in accordance with the procedure described above and illustrated in FIGS. 3A and 3B. This is followed by determining a point where the trailer frame engaging portion 50 or lug 52 will engage the trailer frame F. This point is marked and the trailer lock 30 is removed from the coupler 10. Next is the drilling of a hole or aperture 64 in the trailer frame F at the previously determined point, or the attaching of a steel plate to the trailer frame (3"×3" for example) with a hole in it. The play or clearance provided in the opening 40 that receives the coupler 10 allows sufficient clearance to make insertion of the lug 52 in the aperture 64 a relatively simple process when subsequently locking a gooseneck trailer T with the gooseneck trailer lock 30.

An alternative embodiment of the gooseneck trailer lock 30 of the present invention includes a body 32 incorporating an extension section 66. The extension section 66 is illustrated in phantom line in FIG. 2. As should be appreciated, the extension section 66 extends past the hook 36 in a direction substantially opposite the lug 52. As should be appreciated from reviewing FIG. 5A, when the gooseneck trailer lock 30 is properly secured to lock the trailer T, the extension section 66 extends past the coupler 10 toward the ground. In this position the extension section 66 interferes with any attempt to back the bed of a truck under the gooseneck of the trailer T. This deters a thief from attempting to chain the trailer to his truck and drive off with the trailer without hooking up the coupler 10 to a towing ball connected to the truck.

Figure 6:
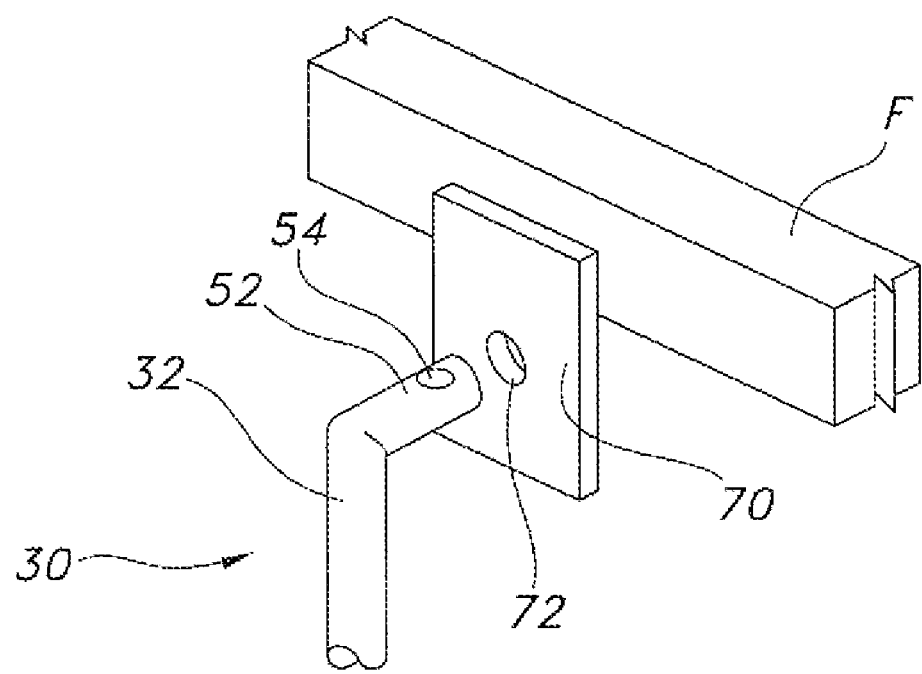
FIG. 6 shows an alternative embodiment of the present invention including an optional mounting plate that is secured to the frame of the trailer.
Figure 7:
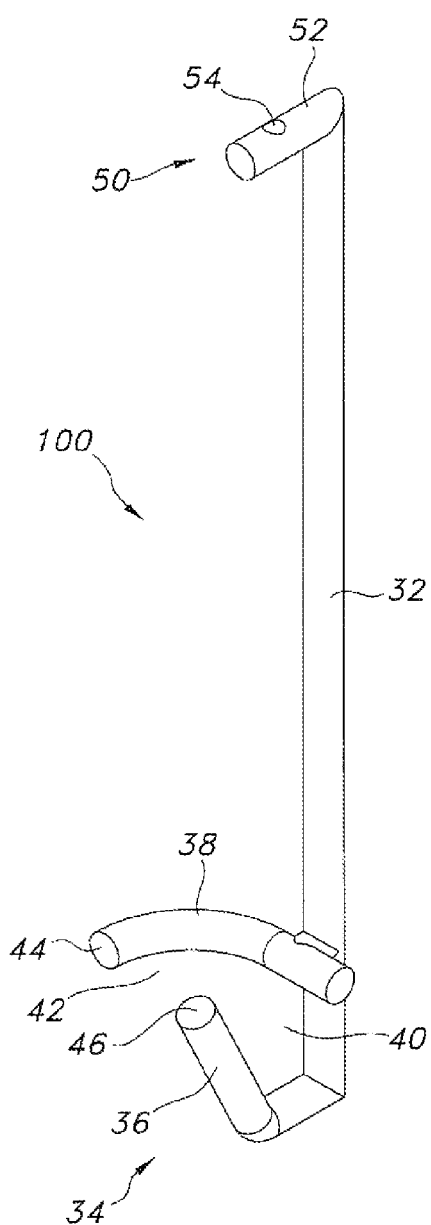
FIG. 7 is a perspective view of yet another alternative embodiment of the present invention.
Figure 8:
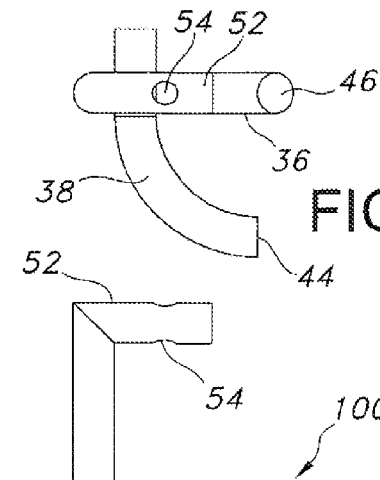
FIG. 8 is a front elevational view of the embodiment illustrated in FIG. 7.
Figure 9:
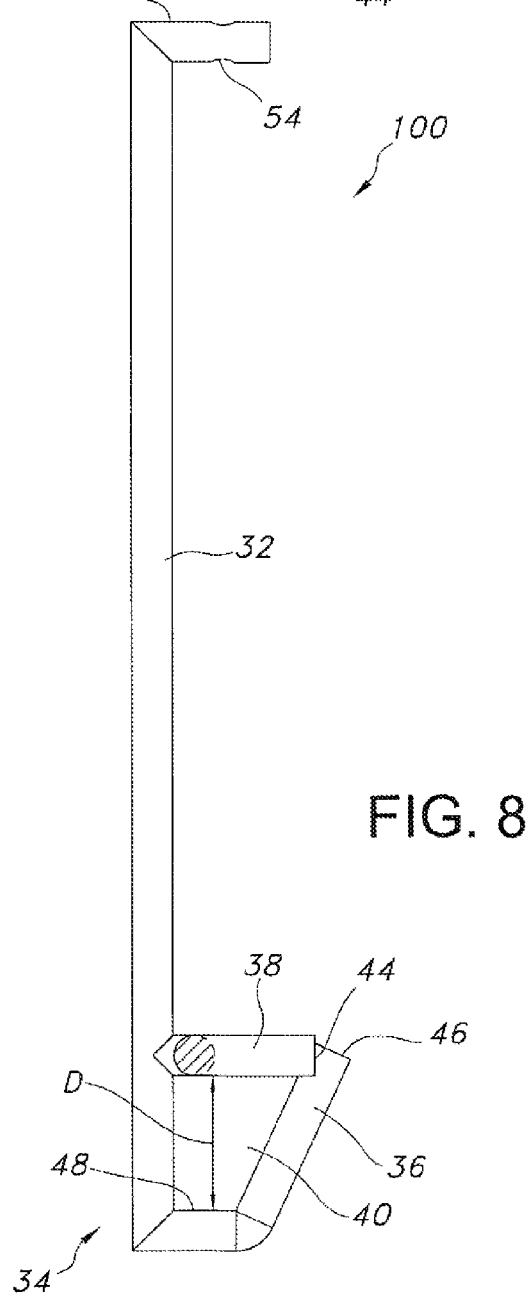
FIG. 9 is a top plan view of the embodiment illustrated in FIG. 7.
Figure 10:
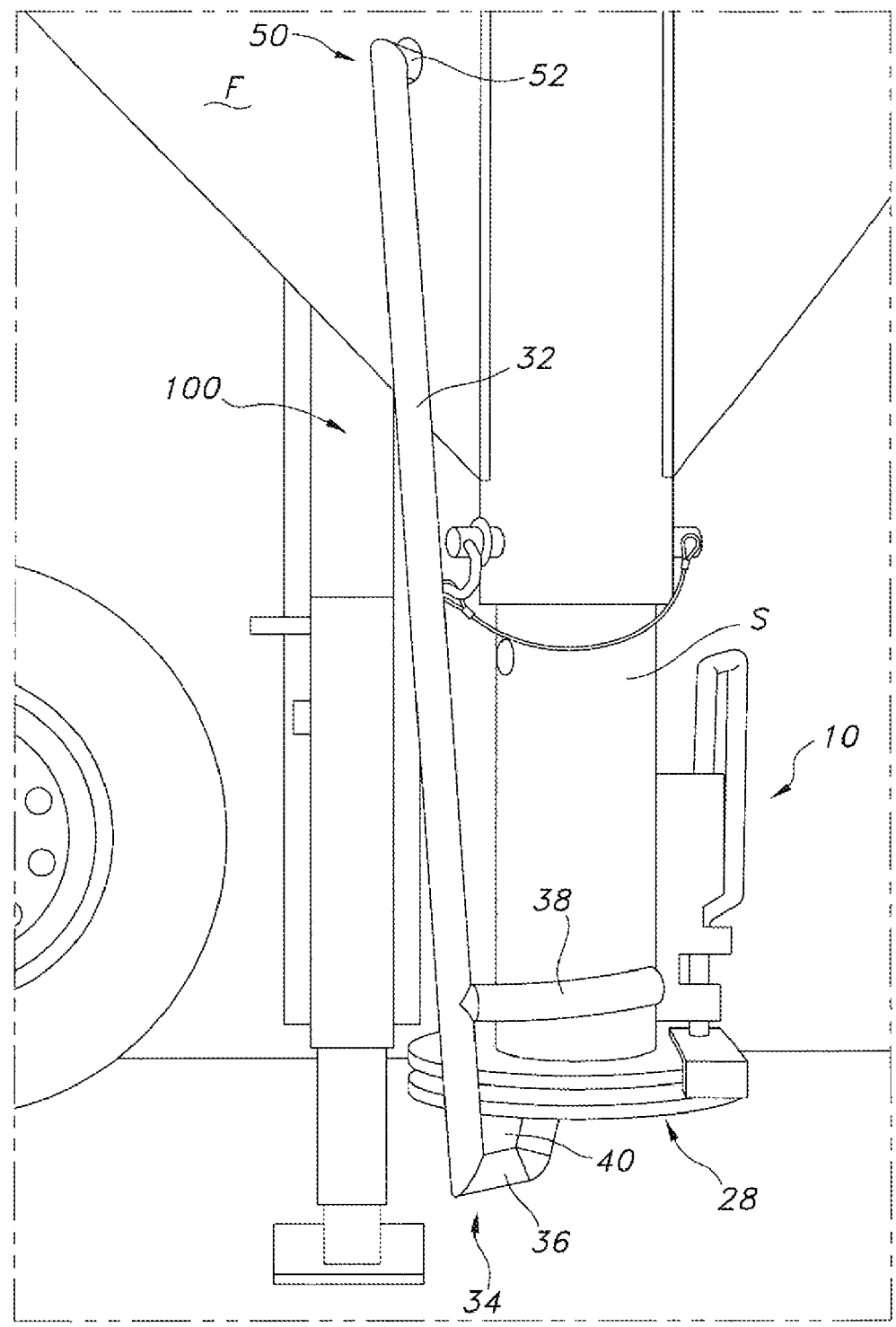
FIG. 10 is a side elevational view illustrating the alternative embodiment of FIG. 7 secured in position to prevent the theft of a gooseneck trailer and the removal of the coupling device from the trailer.

Yet another embodiment is illustrated in FIG. 6. In certain applications, when the hook 36 is properly engaged in the coupler 10, the lug 52 of the gooseneck trailer lock 30 does not align with a proper mounting point on the trailer frame F. If this occurs, an optional mounting plate 70 is secured to the trailer frame F. In one possible embodiment the mounting plate 70 is a steel plate having a size of perhaps three inches square. The plate 70 may be welded to or otherwise connected to the frame F. An aperture 72 is then drilled in the plate 70 in the proper position to receive the lug 52 of the gooseneck trailer lock 30 which is then locked into position.

Still another embodiment of the present invention is illustrated in FIGS. 7-10. This embodiment 100 is very similar to the first embodiment and includes an elongated body 32 formed from a high strength material such as, for example, hardened steel. The body includes a coupler engaging portion 34 comprising a hook 36 and a spur 38. In this embodiment the spur or security lug 38 is arcuate and has a radius of curvature of about 80 mm and extends through an arc of about 90°. This curved spur or security lug 38 better prevents the coupler 10 from being rotated to a point where it can be raised past the spur. Thus, it provides a more secure locking device 100.

As illustrated the hook 36 and spur 38 define an opening 40 and an entryway 42 in communication with the opening. In the illustrated embodiment, the opening 40 is polygonal in shape. Further, the entryway 42 is provided between the distal or first end 44 of the spur 38 and the second or distal end 46 of the hook 36. The opening 40 has a depth D as measured from the top of the opening at the entry way 42 to the bottom 48 of the opening of between about 6.35 centimeters (2-½") and about 8.89 centimeters (3-½").

The body 32 also includes a trailer engaging portion 50 comprising a lug 52. The lug 52 includes an aperture 54 for receiving a shackle of a padlock (not shown) in the same manner as described above with respect to the first embodiment 30 of the invention. The embodiment 100 is installed on the trailer T in the same manner as described in detail above respecting the embodiment 30.

The foregoing description of the preferred embodiments of the present invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims in their fair and broad interpretation in any way.

What is claimed:

1. A gooseneck trailer lock for (a) securing a coupling device to a trailer and (b) preventing coupling of a towing vehicle to the trailer through the coupling device, comprising:

A one-piece body having a coupler engaging portion and a trailer frame engaging portion, said coupler engaging portion including a hook and a spur, said hook and said spur both being in a permanently fixed position whereby said body has a single, permanent, and non-adjustable configuration; and A lock securing said body to a trailer whereby said permanently fixed hook and said permanently fixed spur function in cooperation with said lock to secure the coupler to the trailer frame.

2. The gooseneck trailer lock of claim 1, wherein said hook and spur of said coupler engaging portion define an opening and an entryway in communication with said opening.

3. The gooseneck trailer lock of claim 2, wherein said trailer frame engaging portion is a lug.

4. The gooseneck trailer lock of claim 3, wherein said lug includes an aperture and said lock includes a shackle received in said aperture.

5. The gooseneck trailer lock of claim 4, wherein said lug has a length of between about 3.18 and about 4.45 centimeters.

6. The gooseneck trailer lock of claim 5, wherein said body is made from hardened steel.

7. The gooseneck trailer lock of claim 2, wherein said opening is polygonal in shape and said entryway is provided along one side of said opening between a first end of said spur and a second end of said hook.

8. The gooseneck trailer lock of claim 2, wherein said opening has a depth of between about 6.35 and about 8.89 centimeters and a width adjacent said entryway of between about 6.35 and about 8.89 centimeters and said entryway has a width of between about 4.45 and about 5.72 centimeters.

9. The gooseneck trailer lock of claim 1, wherein said spur is arcuate.

10. The gooseneck trailer lock of claim 9, wherein said spur has a radius of curvature of about 80 mm.

11. The gooseneck trailer lock of claim 10, wherein said spur extends through an arc of about 90°.

\* \* \* \* \*